July 28, 1959  L. STARK  2,897,459
PHASE SHIFTER

Filed Feb. 8, 1957  2 Sheets-Sheet 1

INVENTOR.
Louis Stark,
BY
AGENT.

INVENTOR.
Louis Stark,

AGENT.

United States Patent Office 2,897,459
Patented July 28, 1959

2,897,459
PHASE SHIFTER

Louis Stark, Gardena, Calif., assignor to Hughes Aircraft Company, Culver City, Calif., a corporation of Delaware Application February 8, 1957, Serial No. 639,169

12 Claims. (Cl. 333—31)

This invention relates to electromagnetic wave transmission systems and more particularly to a phase shifter for electromagnetic waves incorporating helical transmission lines.

Electromagnetic wave radiating systems such as antenna arrays having a discrete set of radiation elements may be made to scan a region of space by cyclically varying the phase difference between adjacent elements. In other words, a beam of electromagnetic energy, being the composite of the energy radiated by each element, is scanned by varying the phase of the electromagnetic wave supplied to each of the radiation elements. The variation is such that between adjacent elements the relative phase difference varies cyclically from zero to some maximum value $\psi$. For an array, therefore, of $n$ discrete elements, the total relative phase difference varies from zero to $(n-1)\psi$.

One way of providing phase variation to such a system is to couple each individual radiation element to a common supply terminal by means of individual transmission lines. Each transmission line incorporates a phase shifter adapted to be programmed with all the other phase shifters to effect the desired phase shift variation for each radiation element.

For radiating systems using electromagnetic waves having a frequency of 9,000 megacycles or thereabouts, various types of phase shifters are available, many of which incorporate hollow rectangular waveguides and means for changing the physical path length thereof. As is well known to those skilled in the art, standard rectangular waveguides for X-band operation measure approximately ½" by 1" in cross-section. As the frequency of electromagnetic waves to be radiated decreases to the lower portion of the UHF region or still further, into the upper region of the VHF portion, the size of hollow conductors capable of transmitting such waves becomes prohibitively large. If phase changes of the order of several wave lengths become necessary, the mechanical displacement necessary to provide such a phase shift likewise becomes prohibitively large. For this reason, conventional phase shifters such as dipoles in rectangular waveguides, and the like, are unsuitable for electromagnetic waves having a frequency in the neighborhood of 500 megacycles.

It is therefore an object of this invention to provide a phase shifter which is operable in the 100 to 1,000 megacycle region and which will provide a phase shift by change of the physical path length.

It is a further object of this invention to provide a phase shifter wherein the change in the electrical path length is many times greater than the corresponding displacement in the phase shifter.

It is another object of this invention to provide a phase shifter which is simple in construction, efficient in operation and compact in size.

In accordance with one embodiment of this invention, an electromagnetic wave path is provided which effectively shortens the wave length of the wave along the direction of propagation. The electromagnetic wave is propagated along a helical transmission line so that along a conductive wire making up the transmission line, the velocity of propagation is substantially equal to the velocity of light but along the axis of the helical line the velocity of propagation is reduced by a factor equal to the sine of the pitch angle.

Helical transmission lines are perhaps less well known for the transmission of electromagnetic waves than hollow conductors. However, they have found extensive applications in traveling wave tubes. Various properties of helices are discussed in Chapter 3, Traveling-Wave Tubes, by J. R. Pierce, published by D. Van Nostrand Company, Inc., in 1950, as part of The Bell Telephone Laboratory Series.

To provide a phase shifter utilizing this reduction in the axial electromagnetic wave velocity, two concentrically positioned helical transmission lines are electromagnetically coupled to one another. Axial displacement of one of the transmission lines relative to each other produces a change in electrical path length. The ratio between the mechanical displacement and the change in electrical path length is equal to the sine of the pitch angle which may vary from 0.1 to 0.05.

The novel features which are believed to be characteristic of the invention, both as to its organization and method of operation, together with further objects and advantages thereof, will be better understood from the following description considered in connection with the accompanying drawings in which several embodiments of the invention are illustrated by way of example. It is to be expressly understood, however, that the drawings are for the purpose of illustration and description only, and are not intended as a definition of the limits of the invention.

Figure 1:
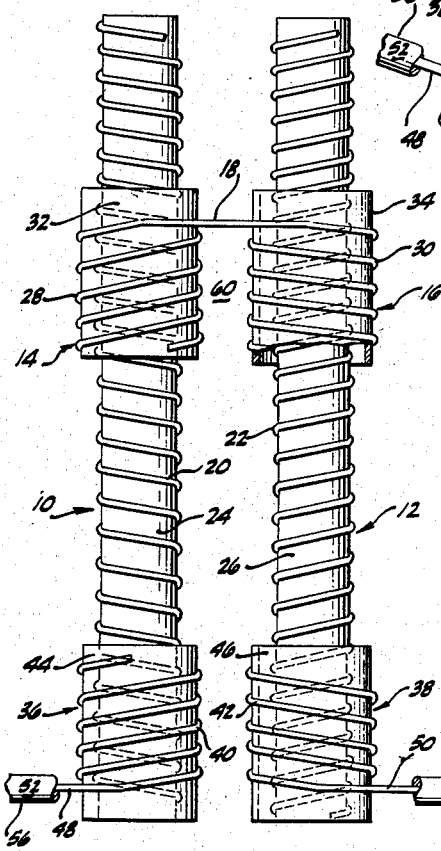
Fig. 1 is a plan view of a single-ended trombone helical phase shifter in accordance with this invention.

Referring now to the drawings wherein like parts are designated by like reference characters and in particular to Fig. 1, there is shown a pair of parallel helical transmission lines 10 and 12. A pair of short coupled helix sections 14 and 16 are disposed concentric with and electromagnetically coupled individually to each of the helical transmission lines 10 and 12. The short coupled helix sections 14 and 16 are also electrically coupled to one another by a coaxial transmission line whose inner conductor 18 is connected to each end of the helix sections 14, 16. The outer conductor of the coaxial transmission is not shown. The helical transmission lines 10, 12 comprise respectively conductive wires 20 and 22 spirally wound upon forms 24 and 26, which forms provide supporting structures. The forms 24 and 26 may be made of a substance which has a small transmission loss for electromagnetic waves in the operating frequency spectrum, such as polystyrene, polytetrafluoroethylene (Teflon), glasscloth, etc. Similarly, the short coupled helix sections, 14, 16 comprise respectively conductive wires 28 and 30 wound upon support forms 32, 34.

One end of each of the helical transmission lines 10, 12 is concentrically surrounded and thereby electromagnetically coupled to a second pair of short coupled helix sections 36 and 38. The second pair of short coupled helix sections 36 and 38 are neither necessary nor essential to the operation of this invention and are merely included to provide, by way of example, convenient input and output means to the helical transmission lines 10 and 12. The short coupled helix sections 36 and 38 comprise conductive wires 40 and 42 supported by forms 44 and 46. All forms may be made out of materials such as specified for forms 24 and 26. The ends of the conductive wires 40 and 42 are connected to the inner conductors 48 and 50 of a pair of coaxial transmission lines 52 and 54 having outer conductors 56 and 58. The operation of the helical phase shifter of Fig. 1 will be discussed hereinafter in connection with the descriptions of Figs. 2 and 3.

The helix sections 14 and 16 may be displaced manually or in any other suitable manner in a direction parallel with the axes of the helical transmission lines 10 and 12, much the same as the movement of a trombone. For this reason, the mechanically coupled combination of short coupled helix sections 14 and 16 are referred to hereinafter as the slide 60 of the trombone and the helical transmission lines 10 and 12 are referred to as the legs 10 and 12 of the trombone.

Figure 2:
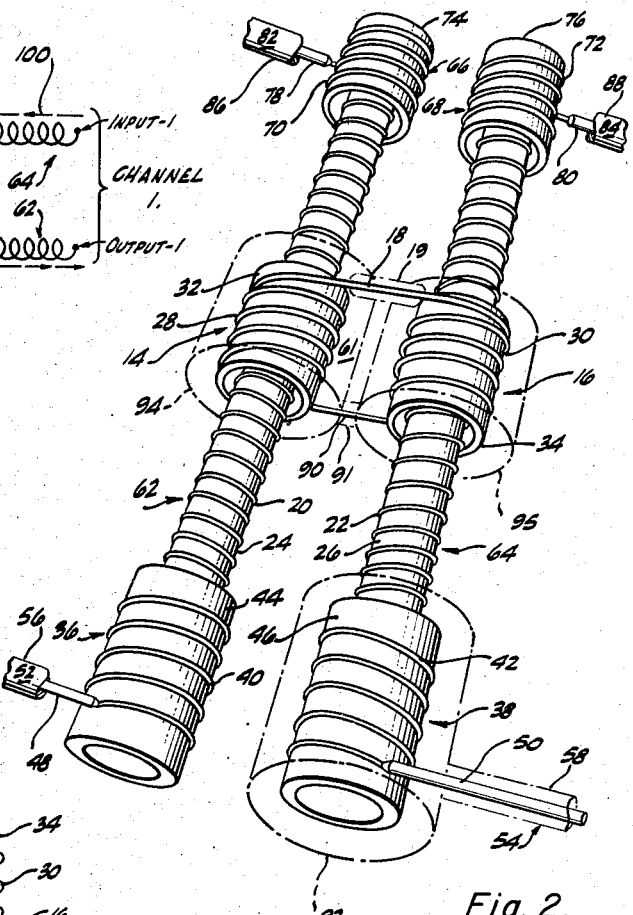
Fig. 2 is a perspective view of a double-ended trombone helical phase shifter in accordance with this invention.

Referring now to Fig. 2, there is shown a pair of helical transmission lines 62 and 64 similar in all respects to the pair of helical transmission lines 10 and 12 of Fig. 1 except that an additional pair of input and output terminals is provided by the additional helix sections 66 and 68.

The pair of short coupled helix sections 66 and 68, similar to the short coupled helix sections 36 and 38 of Fig. 1, comprise a pair of conductive wires 70 and 72 wound around support forms 74 and 76, respectively. One end of each of the short coupled helix sections 66 and 68 are joined to the inner conductors 78 and 80 of the coaxial transmission lines 82 and 84 having outer conductors 86 and 88, respectively.

The trombone slide 61 in Fig. 2 comprises, as described in Fig. 1, a pair of short coupled helix sections 14 and 16. However, whereas in Fig. 1, the short coupled helix sections 14 and 16 were electrically coupled to one another by a single coaxial transmission line having a center conductor 18, the short coupled helix sections 14 and 16 of the trombone slide 61 are electrically coupled to one another by two coaxial transmission lines having center conductors 18 and 90, respectively.

The short coupled helix sections 14, 16; 36, 38; 66 and 68 are surrounded by housings of conductive material. By way of example the housing 92 surrounding the short coupled helix section 38 and the housings 94 and 95 respectively surrounding the helix sections 14 and 16 which comprise the slide of the trombone 61 are shown in phantom view. As is readily seen, the housings 94 and 95 provide a transition from the helix sections to the outer conductors 19 and 91 of the coaxial transmission lines which electrically couple the helix sections 14 and 16 to one another. Similarly, the outer conductor 58 of the coaxial line 54 leads into and becomes part of the housing 92. In this manner, the housings serve several purposes, namely to provide a protective individual cover, an electromagnetic shield, and an electromagnetic mode transition in the region where the coaxial transmission lines end and the helix sections begin.

Figure 3:
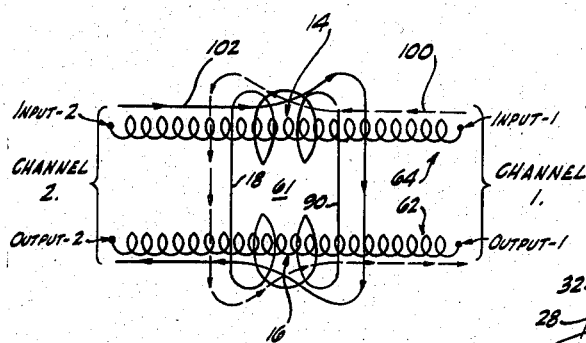
Fig. 3 is a schematic diagram illustrating the theory of operation of the helical phase shifter of the invention.

Fig. 3 illustrates schematically the principle of operation of the double ended trombone helical phase shifter of Fig. 2. For the sake of simplicity the extremities of the trombone legs 62 and 64, respectively are shown as terminated by terminals designated as input-1, input-2; output-1, output-2. The helix sections 36, 38; 66, 68 of Fig. 2 are one embodiment of such terminals and other types of terminals may be used instead. Two electromagnetic wave paths referred to as channel-1 and channel-2 are provided which terminate respectively in terminals input-1, output-1; input-2, output-2.

Along channel-1 wave energy is propagated along the helical transmission line 64 from the terminal input-1 until it encounters the short coupled helix section 14. During propagation along the portion of the helical transmission line 64 which is coextensive with the helix section 14, the wave energy is completely transferred to helix section 14 by electromagnetic coupling. The dashed path 100, which corresponds to channel-1, indicates the progress of the wave energy which is transferred to the helix section 16 by way of the coaxial transmission line having the inner conductor 18. From the helix section 16 the wave energy is electromagnetically coupled to the helical transmission line 62 and propagated towards the terminal of the transmission line 62 designated as output-1.

Along channel-2, wave energy is propagated along the helical transmission line 64 from the terminal input-2, which transmission line is electromagnetically coupled to the transmission line 62 by way of helix section 14, the coaxial transmission line having the center conductor 90 and the helix section 16. The wave energy proceeds along channel-2, shown by the solid line wave propagation path 102 and may be abstracted from output-2.

The operation of the phase shifter of Fig. 1 is similar to the operation of the phase shifter of Fig. 2 except that the transmission lines 62 and 64 are terminated only on one side by terminals. Further, the short helix sections are electrically coupled to one another by a single coaxial transmission line to provide a single wave energy path. Therefore Fig. 3 illustrates the operation of the single-ended phase shifter by using a single channel.

It is readily seen, that as the trombone slide 61 is laterally displaced to right of Fig. 3, the wave energy path 100 is shortened and the wave energy path 102 is lengthened by an equal amount. Consequently, lateral displacement of the slide 61 will provide a relative change of the two wave energy paths and a corresponding phase change between electromagnetic waves traveling between input-1 and output-1 and between input-2 and output-2. A similar but opposite effect is produced when the trombone slide is displaced to the left of the drawing.

The operating frequency for which this type of phase shifter is suitable extends from approximately 100 to 1,000 megacycles per second which corresponds to a free space wave-length from about 12 to 120 inches. The following material is included to show that the phase shifter of this invention only requires a small displacement of the trombone slide to produce a phase shift of several wave lengths.

As is well known to those skilled in the art pertaining to traveling wave tubes, the velocity of propagation along the helical conductor, say 64 of Fig. 3, is substantially equal to the velocity of light $c$. On the other hand, however, the velocity of propagation of the electromagnetic wave along the axis of the helical transmission line 64 is approximately equal to $c \sin \alpha$, where $\alpha$ is the pitch angle of the helix. It is therefore seen that as $\alpha$ decreases, the axial velocity of wave propagation decreases. In terms of wave length it may be said that the helix wave length $\lambda_H$, that is, the wave length in the axial direction, is reduced from free space wave length $\lambda$ approximately by $$\frac{1}{\sin \alpha}$$

the helix wind-up factor. In other words, $$\frac{\lambda}{\lambda_H} = \frac{1}{\sin \alpha}$$

This factor $$\frac{1}{\sin \alpha}$$

may have a range between 10 and 20.

A relationship describing the change in the electromagnetic path length $d$ in a particular unit of length in terms of displacement $\Delta$ of the trombone slide in the same unit of length is easily derived and the result is the following:

$$d = 2\Delta \frac{\lambda}{\lambda_H} = \frac{2\Delta}{\sin \alpha}$$

Therefore, the phase change in electrical degrees is $$\delta = \frac{720\Delta}{\lambda \sin \alpha}$$

for a trombone slide displacement $\Delta$.

Consequently, the lateral trombone slide displacement $\Delta$ is magnified by the helical transmission line and by the fact that two lines are changed simultaneously by twice the helix wind-up factor. It is also well known that concentric helical coils such as helical transmission line 64 and the helix section 14 of Fig. 3 provide electromagnetic coupling to one another by virtue of their relative proximity. This may be compared to the phenomena of induction encountered with ordinary transformers except that the coupling of the transformer is due to the rate of change of the magnetic field whereas the coupling considered here is attributable to the rate of change of the magnetic as well as the electric field.

It has been found that for optimum operation, the mean radius $a$ of the helical transmission line forming one of the legs of the trombone should be such that $ka = \approx 0.2$ where $k$ is $$\frac{2\pi}{\lambda}$$

the free space phase constant.

It has also been found that the mean radius $b$ of the helix section of the trombone slide should be chosen such that $\beta(b-a) = \approx 1.0$ for maximum band width, where $\beta$ is $$\frac{2\pi}{\lambda_H}$$

the helix phase constant.

In order to provide unity coupling, that is, a coupling of all the electromagnetic energy traveling along the helical transmission line to the helix section or vice versa, the length of the helix section is best determined experimentally.

Figure 4:
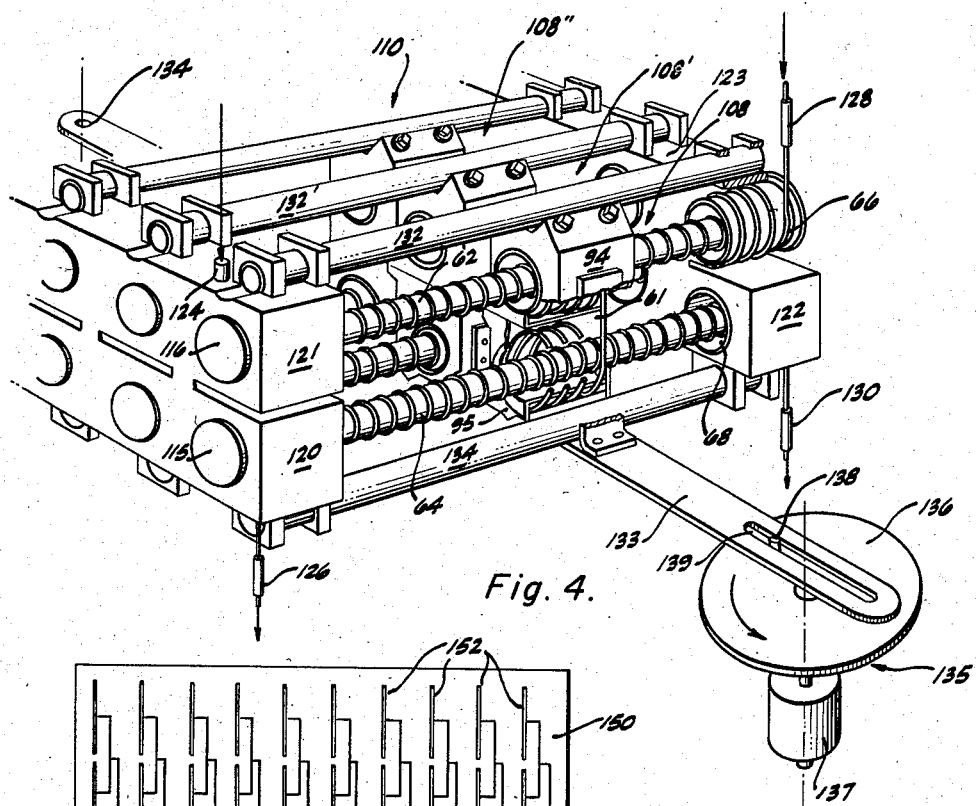
Fig. 4 is a perspective cut-away view of a multi-channel helical phase shifter adapted to feed an antenna array and provide scanning of the radiated beam.

Referring now to Fig. 4 there is shown by way of example a multi-channel phase shifter utilizing the double-ended trombone phase shifter of Fig. 2 as its basic component. The multi-channel phase shifter is adapted to feed an antenna array having discrete radiating elements in such a way as to provide a predetermined periodically varying relative phase differential between individual radiating elements. The relative phase differential is selected to provide a periodically scanning beam of electromagnetic wave energy in a manner well known to those skilled in the art.

The multi-channel phase shifter comprises a plurality of substantially identical double-ended trombone helical phase shifters 108, 108′, 108″ . . . , supported parallel to one another in a suitable frame 110. Therefore only phase shifter 108 will be described and it will be understood that similar elements are provided for the remaining phase shifter such as 108′. The helical phase shifter 108, comprises the pair of helical transmission lines 62 and 64 electromagnetically coupled to one another by the trombone slide 61 as described in conjunction with Fig. 2. The end portions of the helical transmission lines 62 and 64 are supported parallel to one another by endplate supports 115 and 116. Concentrically surrounding the end portions of the helical transmission lines 62 and 64 are the short coupled helix sections 66 and 68 providing convenient coupling means to one of the channels of the phase shifter 108. A like pair of helix sections not shown in Fig. 4 are disposed on the other end to provide convenient coupling means to the other of the channels. Four frame members 120, 121, 122, and 123 contain cylindrical openings into which the helix sections such as sections 66 and 68 are placed. The frame members 120, 121, 122 and 123 provide mechanical support for all the helix sections, the end-plate supports 115 and 116 and at the same time provide the electrical housings such as the electrical housing 92 of Fig. 2.

Access to the two wave energy paths or channels associated with each of the double-ended trombone phase shifters is provided by the coaxial transmission lines 124, 126, 128 and 130. To this end, a hole is drilled into each of the frame members to the cylindrical openings to permit the passage of the conductive wires of the helix sections through the frame member. The conductive wires are then connected to the center conductor of respective coaxial transmission lines 124, 126, 128 and 130. The outer conductors of the coaxial transmission lines are soldered into the holes in the frame members. The frame members are fastened to one another by guide rails 132 and 134 which also serve to guide the translational motion of the trombone slide 61. The trombone slide 61 has two housings 94 and 95 coupled to one another by coaxial transmission lines as shown in detail in Fig. 2. These housings are slidably mounted on the guide rails 132 and 134.

Each one of the trombone slides 61 is mechanically coupled to an actuating member 133. One end of the member 133 is rotatably fastened to an axial support or pivot 134 and the other end is coupled to a drive means 135 adapted to oscillate the member 133 about the axial pivot 134.

The drive means 135 may comprise a motor 137 coupled to plate 136. When the motor 137 is energized, the plate 136 rotates and induces an oscillatory motion to the actuating member 133 about the pivot 134. The actuating member 133 may be coupled to the plate 136 by a pin 138 one end of which is rigidly mounted upon the plate 136 and the other end of which is free to slidingly engage in the slot 139 of the actuating member 133. The oscillations of the actuating member 133 will provide a lateral displacement to each of the trombone slides 61 coupled to the actuating member 133. The displacement of the trombone slide 61, and consequently the relative change of the length of the wave energy path is proportional to the radial distance from the pivot 134 along the actuating member 133 to the point of coupling between the actuating member 133 and the trombone slide 61.

Figure 5:
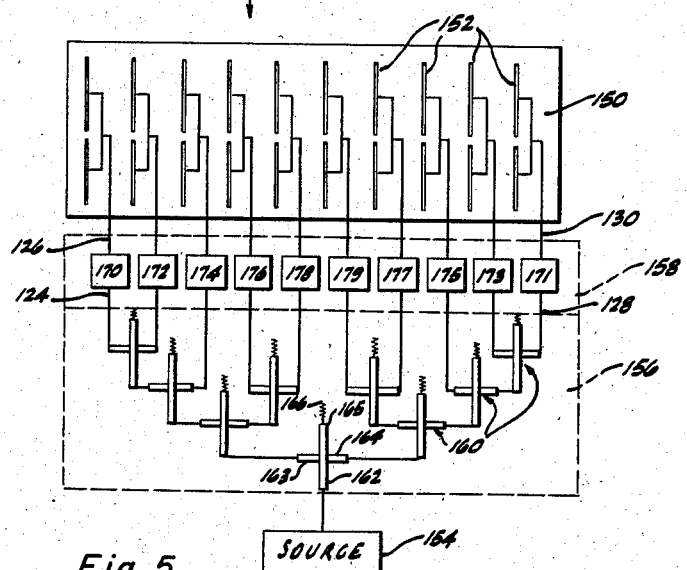
Fig. 5 is a schematic diagram illustrating the interconnections of the multiple helical phase shift unit of Fig. 4 with the radiation elements of the array.

Referring now to Fig. 5, an array 150 having twenty apertures 152 is fed from a source of electromagnetic energy 154. It will be understood that the source 154 may be a transceiver for a radar system. Positioned between the source 154 and the array 150 is a distributing network 156 and a multi-channel phase shifter 158 illustrated schematically.

The distributing network 156 comprises a plurality of hybrid junctions 160 each of which equally divides the wave energy into two portions. Using the nomenclature of hybrid junction, wave energy is introduced into the sum arm 162 and equally distributed by the hybrid junction 160 to the symmetry arms 163 and 164. The difference arm 165 is terminated in a match load 166 to absorb the reflected portion of the wave energy due to impedance mismatches of the individual apertures which are 180° out of phase with one another. Such an out-of-phase component may have a relatively large magnitude due to the fact that the radiators are not fed in phase.

The multi-channel helical phase shifter may be of the type shown in Fig. 4 comprising five individual double-ended trombone phase shifters in combination. The two outermost discrete radiators are fed by phase shifters 170 and 171 comprising the two channels of one of the individual double-ended trombone phase shifter which is positioned nearest to the drive means 135. Consequently, its associated trombone slide is exposed to the maximum amount of lateral displacement compared to that of the other trombone slides. In other words the two outermost radiators are coupled to the double-ended trombone phase shifter closest to the drive means 135 to provide the greatest variation of phase shift. Similarly, the second outermost discrete radiators are fed by phase shifters 172 and 173 which comprise the two channels of the double-ended trombone phase shifter adjacent to the phase shifter having channels 170 and 171, since its lateral displacement is somewhat less than that of the first double-ended trombone phase shifter. Similarly, phase shifters 174, 175; 176, 177; 178 and 179 feeding the remaining discrete radiators 152 are each provided by three additional double-ended trombone phase shifters, each one providing a decreasing lateral displacement.

A typical distribution of relative phase shift in terms of D, the incremental delay between neighboring elements in units such as electrical degrees or fraction of wave length, is as follows: The phase shifters 178 and 179, respectively provide for ½ D and —½ D delay. Similarly, phase shifters 176 and 177 provide for ⅜ D and —⅜ D delay; phase shifters 174 and 175 provide for ⅝ D and —⅝ delay; phase shifters 172 and 173 provide for ⅞ D and —⅞ D delay; and phase shifters 170, 171 provide for ⅑ D and —⅑ D delay.

There has been described a trombone type phase shifter which provides a variable length wave energy path by mechanical displacement of a slide. The phase shifter may be single or double-ended to provide, respectively, one or two channels for electromagnetic wave propagation. A number of phase shifters may be ganged to one another. Such a multiple channel phase shifter is useful for exciting an antenna array and imparting a scanning motion to the resulting beam.

What is claimed is:

1. A single-ended transmission line phase shifter comprising: two helical transmission lines substantially identical to one another and disposed in parallel relation, and two short helix sections, each surrounding one of said helical transmission lines, whereby each of said transmission lines is electromagnetically coupled to its associated helix section, one end of each of said short helix sections being electrically interconnected, and each of said helix sections being adapted for lateral displacement along said helical transmission lines.

2. A double-ended transmission line phase shifter comprising: two helical transmission lines substantially identical to one another and disposed in parallel relation and forming the legs of a trombone, and two short helix sections, each surrounding one of said helical transmission lines, whereby each of said transmission lines is electromagnetically coupled to its associated helix section, both ends of one of said short helix sections being electrically connected to corresponding ends of the other short helix section, said helix sections being adapted for lateral displacement along said helical transmission lines.

3. A single-ended transmission line phase shifter comprising: two helical transmission lines substantially identical to one another and disposed in parallel relation and forming the legs of a trombone, and two short helix sections, each surrounding one of said helical transmission lines, whereby each of said transmission lines is electromagnetically coupled to its associated helix section, one end of each of said short helix sections being electrically interconnected, said helix sections being mechanically coupled to one another to form the slide of said trombone, said slide being adapted for lateral displacement along said helical transmission lines, and means coupled to one end of each of said transmission lines for coupling wave energy to and from said phase shifter.

4. A double-ended transmission line phase shifter comprising: two helical transmission lines substantially identical to one another and disposed in parallel relation and forming the legs of a trombone, and two short helix sections, each surrounding one of said helical transmission lines, whereby each of said transmission lines is electromagnetically coupled to its associated helix section, both ends of one of said short helix sections being electrically connected to corresponding ends of the other short helix section, said helix sections being mechanically coupled to one another to form the slide of said trombone, said slide being adapted for lateral displacement along said helical transmission lines, and means coupled to each end of each of said transmission lines for coupling wave energy to and from said phase shifter, thereby providing two wave energy paths having interdependent electrical lengths.

5. A single-ended transmission line phase shifter comprising: two helical transmission lines substantially identical to one another and disposed in parallel relation and forming the legs of a trombone, two short helix sections, each surrounding one of said helical transmission lines, whereby each of said transmission lines is electromagnetically coupled to its associated helix section, a coaxial transmission line having an inner and an outer conductor, said inner conductor electrically interconnecting one end of each of said short helix sections, and a housing surrounding individually each of said short helix sections, said outer conductor electrically and mechanically interconnecting said two housings to form the slide of said trombone, and said slide being adapted for lateral displacement along said helical transmission lines.

6. A double-ended transmission line phase shifter comprising: two helical transmission lines substantially identical to one another and disposed in parallel relation and forming the legs of a trombone, two short helix sections, each surrounding one of said helical transmission lines, whereby each of said transmission lines is electromagnetically coupled to its associated helix section, two coaxial transmission lines having inner and outer conductors, each of said inner conductors electrically interconnecting corresponding ends of each of said short helix sections, and a housing surrounding individually each of said short helix sections, said two outer conductors electrically and mechanically interconnecting said two housings to form the slide of said trombone, and said slide being adapted for lateral displacement along said helical transmission lines.

7. A single-ended transmission line phase shifter comprising: two helical transmission lines substantially identical to one another and disposed in parallel relation and forming the legs of a trombone, two short helix sections, each surrounding one of said helical transmission lines, whereby each of said transmission lines is electromagnetically coupled to its associated short helix section, a coaxial transmission line having an inner and an outer conductor, said inner conductor electrically interconnecting one end of each of said short helix sections, two housings surrounding individually each of said short helix sections, said outer conductor electrically and mechanically interconnecting said two housings to form the slide of said trombone, said slide being adapted for lateral displacement along said helical transmission lines, a terminal helix section surrounding individually each of said transmission lines at one end thereof to provide terminal means, whereby each of said transmission lines is electromagnetically coupled to its associated terminal helix section, and a coaxial terminal transmission line coupled individually to each of said terminal helix sections.

8. A double-ended transmission line phase shifter comprising: two helical transmission lines substantially identical to one another and disposed in parallel relation and forming the legs of a trombone, two short helix sections each surrounding one of said helical transmission lines, whereby each of said transmission lines is electromagnetically coupled to its associated short helix section, two coaxial transmission lines having inner and outer conductors, each of said inner conductors electrically interconnecting corresponding ends of each of said short helix sections, a housing surrounding individually each of said short helix sections, said two outer conductors electrically and mechanically interconnecting said two housings to form the slide of said trombone, said slide being adapted for lateral displacement along said helical transmission lines, a terminal helix section surrounding individually each of said transmission lines at each end thereof to provide terminal means, whereby each of said transmission lines is electromagnetically coupled to each of its associated terminal helix sections, and a coaxial terminal transmission line coupled individually to each of said terminal helix sections.

9. A single-ended transmission line phase shifter comprising: two helical transmission lines substantially identical to one another and disposed in parallel relation and forming the legs of a trombone, and two short helix sections, each surrounding one of said helical transmission lines, whereby each of said transmission lines is electromagnetically coupled to its associated helix section, each of said transmission lines and each of said helix sections including respectively a central non-conductive support form of substantially cylindrical configuration and a conductive wire helically wound upon the support form, one end of each of said short helix sections being electrically interconnected, said helix sections being mechanically coupled to one another to form the slide of said trombone, and said slide being adapted for lateral displacement along said helical transmission lines.

10. A double-ended transmission line phase shifter comprising: two helical transmission lines substantially identical to one another and disposed in parallel relation and forming the legs of a trombone, and two short helix sections, each surrounding one of said helical transmission lines, whereby each of said transmission lines is electromagnetically coupled to its associated helix section, each of said transmission lines and each of said helix sections including respectively a central non-conductive support form of substantially cylindrical configuration and a conductive wire helically wound upon the associated support form, both ends of one of said short helix sections being electrically connected to corresponding ends of the other short helix section, said helix sections being mechanically coupled to one another to form the slide of said trombone, said slide being adapted for lateral displacement along said helical transmission lines.

11. A multi-channel transmission line phase shifter adapted to provide scan means for an electromagnetic wave antenna array and comprising: a plurality of single-ended transmission line phase shifters; each of said single-ended transmission line phase shifters including two helical transmission lines substantially identical to one another and disposed in parallel relation and forming the legs of a trombone, two short helix sections, each surrounding one of said helical transmission lines, whereby each of said transmission lines is electromagnetically coupled to its associated helix section, one end of each of said short helix sections being electrically interconnected, said helix sections being mechanically coupled to one another to form the slide of said trombone, said slide being adapted for lateral displacement along said helical transmission lines; and programming means interconnecting said trombone slides of said phase shifters and adapted to provide a progressively varying and periodically repeating predetermined lateral displacement of each of said trombone slides.

12. A multi-channel transmission line phase shifter adapted to provide scan means for an electromagnetic wave antenna array and comprising: a plurality of double-ended transmission line phase shifters; each of said double-ended transmission line phase shifters, including two helical transmission lines substantially identical to one another and disposed in parallel relation and forming the legs of a trombone, two short helix sections, each surrounding one of said helical transmission lines, whereby each of said transmission lines is electromagnetically coupled to its associated helix section, both ends of one of said short helix sections being electrically connected to corresponding ends of the other short helix section, said helix sections being mechanically coupled to one another to form the slide of said trombone, said slide being adapted for lateral displacement along said helical transmission lines; and programming means interconnecting said trombone slides of said plurality of phase shifters and adapted to provide progressively varying and periodically repeating predetermined lateral displacement of each of said trombone slides.

References Cited in the file of this patent
UNITED STATES PATENTS

| | | |
|---|---|---|
| 1,628,992 | Mills | May 17, 1927 |
| 2,258,147 | Roberts | Oct. 7, 1941 |